United States Patent [19]

Johannesen et al.

[11] 4,310,075
[45] Jan. 12, 1982

[54] DISC BRAKE

[75] Inventors: Donald D. Johannesen; Raymond P. Haluda, both of South Bend, Ind.

[73] Assignee: The Bendix Corporation, Southfield, Mich.

[21] Appl. No.: 128,425

[22] Filed: Mar. 10, 1980

[51] Int. Cl.³ .............................................. F16D 65/02
[52] U.S. Cl. .............................. 188/73.45; 188/73.33; 188/73.35
[58] Field of Search ..................... 188/73.3, 73.5, 73.6

[56] References Cited

U.S. PATENT DOCUMENTS

| 3,616,876 | 11/1971 | Brooks | 188/73.3 |
| 3,648,807 | 3/1972 | Lottridge et al. | 188/73.3 |
| 3,882,972 | 5/1975 | Newstead et al. | 188/73.6 |
| 4,084,665 | 4/1978 | Burnett | 188/73.3 |

FOREIGN PATENT DOCUMENTS

| 2250843 | 4/1974 | Fed. Rep. of Germany | 188/73.3 |
| 2284800 | 4/1976 | France | 188/73.3 |
| 1506860 | 4/1978 | United Kingdom | 188/73.3 |

Primary Examiner—Edward R. Kazenske
Attorney, Agent, or Firm—Paul David Schoenle; Ken C. Decker

[57] ABSTRACT

A floating-caliper disc brake (10) includes a non-rotating torque member (38) which carries the caliper (22) in fixed radial position relative to the disc (12) via a pair of pins (50). The torque member and caliper each have matching grooves (46, 48) which, when placed in registry, define a pair of apertures (49) between the caliper and the arms (40, 42) of the torque member. The pins are complementary in cross-section to the shape of these apertures so as to space apart the caliper and the torque member when the pins are inserted into the apertures. Brake torque is transferred from the caliper to the torque member solely through the pins which may be made of a material resistant to corrosion. Sliding of the caliper along the pins provides for axial movement of the caliper relative to the torque member and brake rotor, but the caliper is otherwise restrained from movement in the radial and circumferential directions.

3 Claims, 6 Drawing Figures

DISC BRAKE

The invention relates to a floating caliper disc brake.

Floating caliper disc brakes include a rotor having friction faces on opposite sides thereof and a caliper cooperating with a pair of friction elements to urge the pair of friction elements into engagement with the friction faces on the rotor to retard rotation of the rotor when a brake application is effected. A non-rotating torque member carries the caliper in substantially fixed radial position relative to the rotor. The caliper is movable, or floats, axially to a limited degree relative to the rotor and torque member.

A disc brake is known in accordance with U.S. Pat. No. 4,084,665 to Burnett in which the torque member includes a pair of circumferentially spaced arms which carry the caliper between them. The caliper and arms both define cooperating abutments which transfer brake torque from the caliper to the torque member. The caliper is keyed to the torque member in the radial direction by a pair of pins which are inserted into axially extending apertures defined between the torque member and caliper. Matching grooves or slots in the torque member and caliper, when placed in registry, define the apertures. Limited axial movement of the caliper relative to the disc is made possible by sliding of the caliper along the pins.

With a brake of this kind, brake torque is transferred from the caliper to the torque member solely by the cooperating abutments of the caliper and torque member arms. Corrosion of the abutment surfaces causes resistance to sliding of the caliper relative to the torque member, with the result that an equal and even application of force to the friction elements is not achieved upon a brake application. In the brake disclosed in the Burnett patent, an attempt has been made to space apart the abutment surfaces in the brake release condition by the use of elastomeric rings on the pins so that corrosion of the abutment surfaces does not interfere with sliding of the caliper. Upon an application of the brake, the resilient elastomeric rings are distorted and the abutment surfaces contact and transfer brake torque to the torque member. However, spacing apart of the abutment surfaces facilitates the entrance of moisture, dirt, and other contamination between the abutments, which contamination promotes corrosion of the surfaces and may build up to the point that the caliper does not slide freely.

The invention as claimed is intended to remedy these drawbacks. The design of our invention permits the components which carry the torque transmitting surfaces to be made from a corrosion resistant material. Because all of the brake torque is transferred to the torque member by the axial pins which carry the caliper and restrain it from movement radially and circumferentially with respect to the arms of the torque member. Accordingly, these pins define the torque transmitting surfaces of the brake. In view of their relatively small size, the pins may be made of materials which resist corrosion but which are too expensive or are otherwise unsuitable for use in making the torque member and caliper.

The advantages offered by the invention are mainly that the torque transmitting surfaces of the brake, e.g., the pins, may be made of corrosion resistant material and the remainder of the brake may be made from a less expensive material. Accordingly, the torque transmitting surfaces are made corrosion-resistant without substantial cost penalty. The caliper thus will slide freely relative to the torque member despite exposure of the brake to conditions which would corrode the sliding surfaces of prior brakes and would result in reduced performance of these prior brakes. Service to the brake, such as replacement of the friction elements, is facilitated also because the corrosion resistant pins are easily removable from the brake so that disassembly of the brake is easier than is the case with prior art brakes wherein many of the parts may corrode and adhere to each other so that disassembly of the brake is difficult.

One way of carrying out the invention is described in detail below with reference to drawings which illustrate only one specific embodiment, in which.

Figure 2:
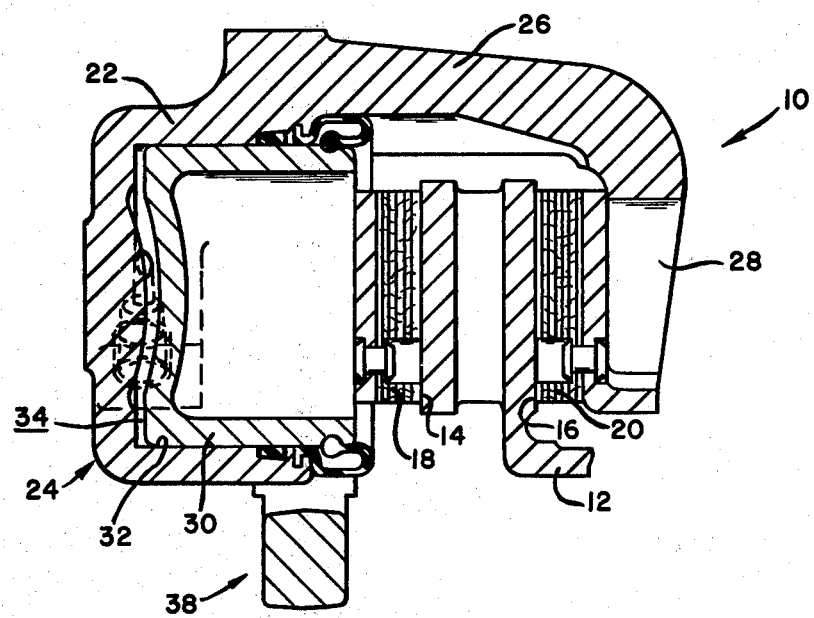
FIG. 2 is a cross-sectional view taken substantially along line 2—2 of FIG. 1.

Referring to FIG. 2, a disc brake indicated generally by the numeral 10 includes a rotor 12 rotatable with an axle assembly (not shown) and having a pair of opposed friction faces 14 and 16. A pair of friction elements 18, 20 are disposed adjacent the friction faces 14 and 16, respectively. The friction elements 18 and 20 are urged into braking engagement with their corresponding friction faces 14 and 16 when a brake application is effected. A caliper 22 includes a fluid motor portion 24 disposed adjacent the friction face 14, a bridge portion 26 that traverses the periphery of the rotor 12, and a radially inwardly extending reaction portion 28 which is disposed adjacent the face 16. The fluid motor portion 24 includes a piston 30 slidably arranged in a bore 32 defined within caliper 22. Fluid is communicated to the variable volume chamber 34 defined between the end of the piston and corresponding end of the bore 32 when a brake application is effected, to urge the piston 30 toward the rotor 12. When the brake is subsequently released, the piston 30 is returned to its brake-release position.

Figure 1:
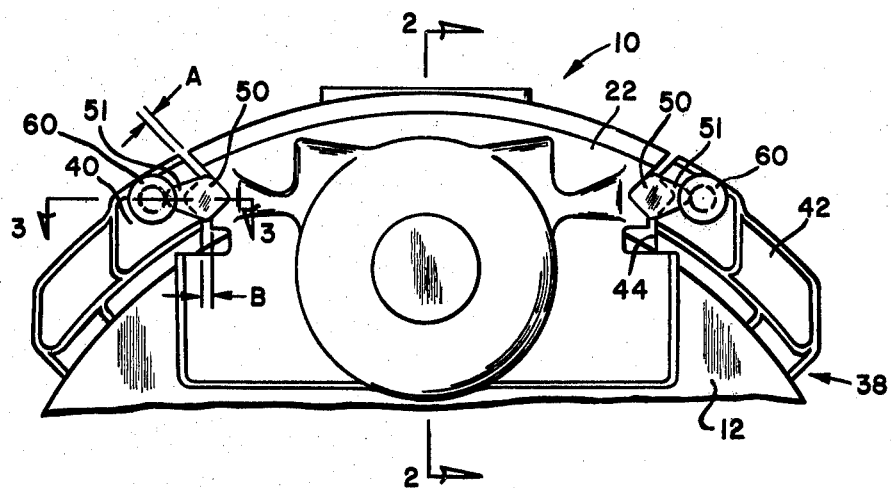
FIG. 1 is a fragmentary side elevation of a disc brake made pursuant to the present invention.

Turning to FIG. 1, the caliper 22 is mounted for axial movement with respect to the rotor 12 by a torque member 38, which is secured to a non-rotation portion of the axle assembly (not shown). The torque member 38 includes a pair of circumferentially spaced arms 40, 42 that define a recess 44 therebetween.

Since the caliper mounting area of torque member 38 is symmetrical, the circumferentially spaced arms 40, 42 are similar, and therefore only the arm 40 will be described in detail, it being understood that the arm 42 is symmetrically opposite the arm 40.

Figure 3:
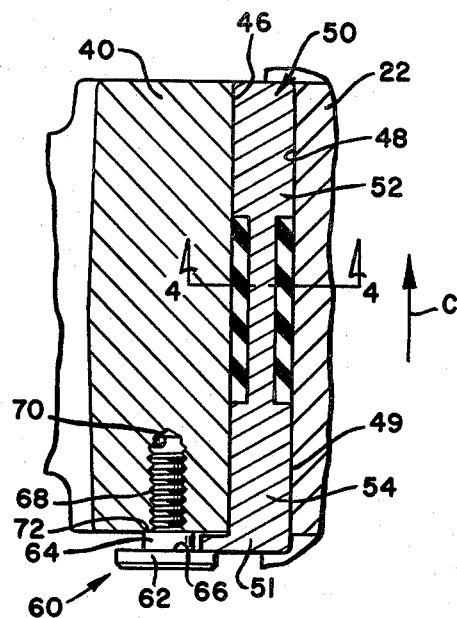
FIG. 3 is a cross-sectional view taken substantially along line 3—3 of FIG. 1.
Figure 4:
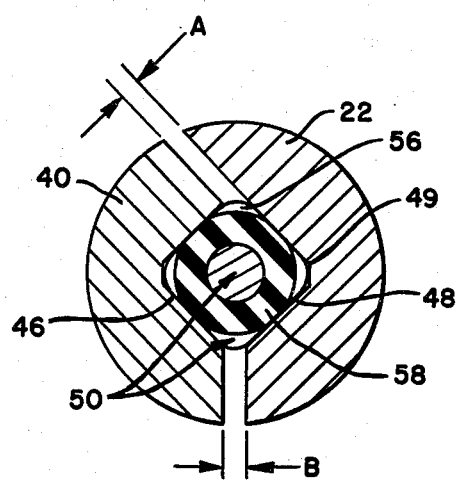
FIG. 4 is an enlarged cross-sectional view taken substantially along line 4—4 of FIG. 3.

Turning now to FIGS. 3 and 4, the torque member arm 40 and the caliper 22 include matching V-shaped slots or grooves 46, 48, respectively. Slots 46, 48 when placed in registry with each other, define a substantially square-shaped aperture 49 which extends axially between the arm 40 and caliper 22. In accordance with the invention, a pin or key 50 having ends of generally square cross-section is disposed between the arm 40 and the caliper 22 within the matching V-shaped slots 46, 48 which define aperture 49. Pin 50 includes end portions 52, 54 which are unyielding and of a close sliding fit within aperture 49. A recess 56 on pin 50 receives a cylindrical elastomeric sleeve 58 which is of a free diameter greater than the distance between the parallel edges of the square aperture 49. As a consequence, sleeve 58 is slightly distorted within aperture 49 and engages arm 40 at slot 56 and caliper 22 at slot 58 to maintain a rattle-free support of caliper 22 upon the pins 50 which are carried between torque member arms 40 and 42. The frictional engagement of sleeve 58 with the caliper 22 at slot 48 is such as to allow ready axial movement of the caliper relative to the support member arm 40.

Viewing FIG. 1, caliper 22 is carried between support member arms 40, 42 solely by the pins 50 which are received in the spaced apart apertures 49. Caliper 22 is spaced from the arms 40, 42 of torque member 38 by clearances A and B. Thus, caliper 22 is substantially fixed radially and circumferentially relative to torque member 40 and is free to move axially relative to the rotor 12 and torque member 38 by sliding along the pins 50.

One end of pin 50, viewing FIG. 3, includes a tab 51 which projects radially from the pin and which lies adjacent to torque member arm 40. A bolt 60 includes a head 62 and a shank portion 64 which cooperates to define a shoulder 66 therebetween. A screw-threaded portion 68 of bolt 60 threadably engages a bore 70 in the torque member arm 40 near V-shaped groove 46. Shank portion 64 cooperates with the screw-threaded portion 60 to define a shoulder 72 therebetween. The distance between shoulders 66 and 72 of bolt 60 slightly exceeds the thickness of tab 51. Pin 50 cannot rotate within aperture 49 to move tab 51 out of registry with the bolt 60 because of the square cross-section of pin 50 which is closely fitted within the registered V-shaped slots 46, 48. Tab 51 prevents pin 50 from moving through the aperture 49 so that the pin is captive in the aperture and is substantially fixed relative to the torque member arm 40.

Figure 5:
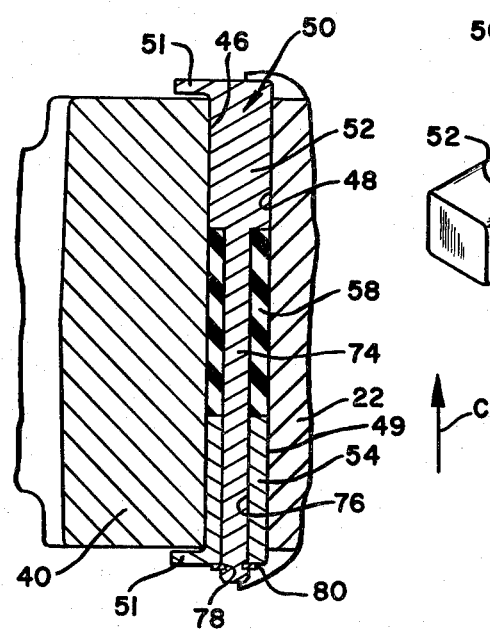
FIG. 5 is a cross-sectional view similar to FIG. 3 illustrating a modification of the present invention.
Figure 6:
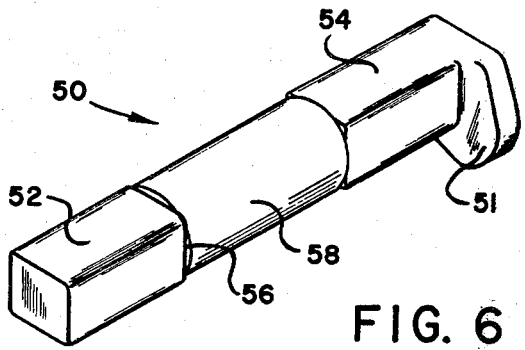
FIG. 6 is a perspective view of one of the pins of the embodiment of FIGS. 1–4.

In the embodiment of FIG. 5, the pin 50 includes end portions 52 and 54 which are connected by a shank 74. End portion 52 is integral with shank 74 and end portion 54 includes a bore 76 through which shank 74 extends. A groove 78 on the shank 74 receives a snap ring 80 which retains the portion 54 on shank 74. End portions 52 and 54 are spaced apart by a cylindrical sleeve 58 of elastomeric material. Each of the end portions 52, 54 includes a tab 51 which lies adjacent the torque member arm 40. Tabs 51 prevent pin 50 from moving through the aperture 49 either up or down, viewing the Figure, so that pin 50 is captive in aperture 49 and is substantially fixed relative to torque member arm 40.

When a brake application is effected, high pressure fluid is admitted into the variable volume chamber 34 where it urges the piston 30 toward the friction face 14, thereby urging the friction element 18 into frictional engagement with the friction face 14. As is well known in the art, reaction forces acting through bridge 26 and the reaction portion 28 of the caliper 22 will also urge the friction element 20 into frictional engagement with the friction face 16 to brake or retard the rotation of the rotor 12.

Viewing FIGS. 3 and 5, the reaction forces acting through bridge 26 move the caliper 22 in the direction indicated by the arrow C when a brake application is effected. In view of the close sliding fit between the pins 50 and slots 46, 48 caliper 22 is substantially fixed radially and circumferentially relative to torque member 38. Pins 50 are substantially fixed axially relative to torque member arms 40, 42 so that caliper 22 slides at the surface of groove 46 relative to the pins 50 to move axially relative to rotor 12 and torque member 38.

Torque developed by friction elements 18, 20 during a brake application and transferred to caliper 22 is transferred from the caliper to pins 50 and hence to torque member 38.

Consequently, the present invention provides for axial movement of the caliper 22 relative to the torque member 38 at a surface which is carried by a relatively small part. In view of their relatively small size, pins 50 may be made of a material which is corrosion resistant but which may be too expensive or may be otherwise unsuitable for use in making the support member 38 or caliper 22. Thus, our invention provides a disc brake in which the sliding, torque transmitting surfaces may be made of a corrosion resistant material without a substantial cost penalty. Additionally, because of their corrosion resistance, the pins may be readily removed from the brake assembly to allow separation of the caliper from the torque member.

We claim:
1. A disc brake comprising:
a rotor having friction faces on opposite sides thereof and rotatable about an axis perpendicular to the plane of said rotor;
a caliper cooperating with a pair of friction elements to urge the pair of friction elements into engagement with the friction faces on the rotor to retard rotation of said rotor;
a nonrotating torque member having a pair of axially extending slots for receiving a pair of pins, said caliper having a pair of axially extending slots which are substantially matched to said pin-receiving slots of the torque member;
a pair of pins disposed within said matching slots between said caliper and said torque member; characterized in that each one of said pair of pins includes a first and a second unyielding pin portion which are complementary in cross section to and received in said matching slots so as to establish a sliding fit between said caliper, said torque member, and said pin portions; said caliper and said torque member being spaced apart by said unyielding pin portions which comprise the sole means of transferring torque from said caliper to said torque member;
means for retaining said pair of pins in said matching slots, said pin retaining means including a first pair of tabs projecting radially from said first unyielding pin portions, said first pair of tabs cooperating with said torque member to prevent said pair of pins from moving through said matching slots in a first direction, said pin retaining means further including a second pair of tabs projecting radially from said second unyielding pin portions, said second pair of tabs cooperating with said torque member to prevent said pair of pins from moving through said matching slots in a direction opposite to said first direction, one of said first and second pin portions of each of said pair of pins includes an axially extending elongate shank, the other of said first and second pin portions of each of said pair of pins defining an axially extending bore receiving said shank, said first and second pin portions being se- cured one to the other by said shank carrying a removable retainer cooperating with said other of said first and second pin portions, and said first and second pin portions of each of said pair of pins being separable by removal of said retainer from said shank.

2. The invention of claim 1 wherein said first and second pin portions of each of said pair of pins cooperate to define a recess therebetween, a cylindrical sleeve member of elastomeric material received in each said recess, and each said sleeve member defining a free outer diameter which is greater than the minor cross-sectional dimension of the respective one of said matching slots, whereby said sleeve members are distorted within said matching slots and frictionally engage said caliper and said torque member.

3. A disc brake of the type including a rotor which is rotatable about an axis, said rotor defining a pair of plane annular friction faces on opposite sides thereof, said friction faces being radially spaced from said axis and perpendicular thereto, a nonrotatable torque member having a pair of circumferentially spaced arms which define a recess therebetween; a caliper received in said recess between said torque member arms and including a fluid motor portion disposed adjacent one friction face of said rotor, a bridge portion spaced from the periphery of said rotor, and a reaction portion extending radially inwardly adjacent the other friction face of said rotor; a first friction element disposed between said fluid motor portion and said one friction face and a second friction element disposed between said reaction portion and the other friction face, said torque member arms defining first and second axially extending V-shaped grooves confronting said caliper, said caliper defining axially extending V-shaped grooves in registry with said grooves defined by said torque member arms, said grooves in registry defining first and second circumferentially spaced axially extending apertures which are substantially square in cross section, a first and a second pin respectively disposed in said first and second apertures supporting said caliper for rectilinear axial movement relative said torque member while substantially preventing radial and circumferential movement of said caliper, the improvement wherein each of said first and second pins includes a pair of unyielding end portions which are substantially square in cross section and which are slidably received within said first and second apertures to space apart said caliper and said torque member, said end portions comprising the sole means for transferring torque from said caliper to said torque member and including means for preventing the movement of said end portions through said apertures, one of said pairs of end portions of each of said first and second pins includes an axially extending elongate shank, the other of said pairs of end portions of each of said first and second pins defining an axially extending bore receiving said shank, said pairs of end portions being secured one to the other by said shank carrying a removable retainer cooperating with said other of said pairs of end portions, and said pairs of end portions of each of said first and second pins being separable axially out of said respective apertures by removal of said retainer from said shank.

* * * * *